DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 28, 1970

873 O.G. 1033

T873,016

EXTRACTION OF DELETERIOUS RESIDUES FROM POLYCARBONATE OF 2,2,4,4-TETRAMETHYL-1,3-CYCLOBUTANEDIOL

Russell Gilkey, 1704 Springfield Ave. 37660, and John R. Caldwell, 404 Colonial Heights Road 37663, both of Kingsport, Tenn.

Filed Nov. 28, 1969, Ser. No. 880,974
Int. Cl. C08g *22/00*
U.S. Cl. 260—77.5
No Drawing. 14 Pages Specification

Substantially all of the alkali metal catalyst residues contained in the polycarbonates of 2,2,4,4-tetramethyl-1,3-cyclobutanediol can be removed therefrom without materially affecting the chemical composition of the polycarbonate by treating the polycarbonate with an acidic organic compound having an ionization constant of about $2\times10^{-1}$ to $2.5\times10^{-6}$ and sufficient solvent power to diffuse through the polycarbonate to contact and provide the residues of said alkali metal catalyst in a form removable from the polycarbonate. Removal of these catalyst residues provides a final polycarbonate product having greatly improved thermal and hydrolytic stability and improved resistance to weathering. Color impurities are also removed by the process thereby providing, in addition, a product of improved color. The polycarbonate contacted with the organic acidic compound may be either in solid form or in solution, and the alkali metal catalyst residues dispersed or dissolved in the polymer may be extracted therefrom by the acidic organic compounds which are selective solvents for the alkali metal residues. Alternatively, the acidic organic compounds may be added to a solution of the polymer in water-immiscible solvents to convert the alkali metal catalyst residues to a water-soluble form which can be easily removed by a liquid-liquid extraction with water. Thus, the organic compound contacting step provides the alkali metal catalyst residues in a form that can be removed from the polycarbonate, which form is either an acidic organic compound-alkali metal catalyst residue extraction mixture or a water-soluble reaction product of the alkali metal catalyst and the acidic organic compound. The residues of alkali metal catalysts employed may be dissolved or dispersed in the polymer in their original catalyst form, or as a derivative of the original catalyst, or as reactant or reaction products. Illustrative of suitable acidic organic compounds for use in the process are carboxylic acids containing at least one carboxyl group, acid phosphates and phosphites, sulfonic acids, disulfonylimides and the like.